US009367418B2

(12) United States Patent
Dash et al.

(10) Patent No.: US 9,367,418 B2
(45) Date of Patent: Jun. 14, 2016

(54) APPLICATION MONITORING

(71) Applicant: Tata Consultancy Services Limited, Mumbai (IN)

(72) Inventors: Hemanta Kumar Dash, Bhubaneswa (IN); Subhasish Mohanty, Bhubaneswa (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 454 days.

(21) Appl. No.: 13/779,639

(22) Filed: Feb. 27, 2013

(65) Prior Publication Data
US 2013/0227353 A1 Aug. 29, 2013

(30) Foreign Application Priority Data
Feb. 28, 2012 (IN) .............. 537/MUM/2012

(51) Int. Cl.
*G06F 11/30* (2006.01)
(52) U.S. Cl.
CPC .......... G06F 11/302 (2013.01); G06F 11/3065 (2013.01)
(58) Field of Classification Search
CPC ............ G06F 11/3636; G06F 11/3466; G06F 11/3476; G06F 2201/865; G06F 11/3055; G06F 11/3664; G06F 11/302
See application file for complete search history.

(56) References Cited

U.S. PATENT DOCUMENTS

| 5,224,212 | A | 6/1993 | Rosenthal et al. | |
|---|---|---|---|---|
| 6,202,199 | B1 * | 3/2001 | Wygodny et al. | 717/125 |
| 6,658,416 | B1 * | 12/2003 | Hussain et al. | |
| 6,732,307 | B1 * | 5/2004 | Edwards | G06F 11/3636 714/45 |
| 6,915,466 | B2 * | 7/2005 | Mastro | H04L 43/026 714/712 |
| 6,970,924 | B1 * | 11/2005 | Chu | H04L 41/5067 709/224 |
| 7,080,285 | B2 * | 7/2006 | Kosugi | H04L 41/069 714/27 |
| 7,203,732 | B2 * | 4/2007 | McCabe | G06F 11/2058 709/217 |
| 7,260,692 | B1 * | 8/2007 | Zahavi | G06F 11/3034 710/18 |
| 7,346,476 | B2 * | 3/2008 | Levine et al. | 702/187 |
| 7,593,351 | B1 * | 9/2009 | Zioulas | H04L 12/2602 340/3.2 |
| 7,596,373 | B2 * | 9/2009 | McGregor | H04W 24/00 455/418 |
| 7,689,558 | B2 | 3/2010 | Rossmann | |
| 7,805,629 | B2 * | 9/2010 | Insley | H04L 1/08 709/219 |
| 7,934,202 | B2 * | 4/2011 | Messmer et al. | 717/131 |
| 7,996,517 | B2 * | 8/2011 | Carter | G06F 11/203 709/224 |
| 8,001,427 | B2 * | 8/2011 | Sohm et al. | 714/45 |
| 8,005,943 | B2 | 8/2011 | Zuzga et al. | |
| 8,028,200 | B2 * | 9/2011 | Ivanov | G06F 11/3466 714/45 |
| 8,060,076 | B2 * | 11/2011 | Shiver | H04W 24/08 455/403 |

(Continued)

OTHER PUBLICATIONS

European Search Report for corresponding European Patent Application No. 13156871, 3 pages, (May 2, 2013).

*Primary Examiner* — Loan L. T. Truong
(74) *Attorney, Agent, or Firm* — Blakely Sokoloff Taylor & Zafman LLP

(57) ABSTRACT

Methods and systems for monitoring of software applications are described herein. In one implementation, monitoring data corresponding to at least one component of the application is obtained based on user preferences. The monitoring data comprises data pertaining to the software application at least one of an application level and a database level. The monitoring data is transferred to a monitoring buffer after the completion of first predetermined time interval. The monitoring data is further transferred from the monitoring buffer to a database after a second predetermined time interval. The transfer process is asynchronous of the application execution process.

14 Claims, 2 Drawing Sheets

(56) References Cited

U.S. PATENT DOCUMENTS

| | | | |
|---|---|---|---|
| 8,108,639 B2* | 1/2012 | Emaru | G06F 11/2069 711/151 |
| 8,181,161 B2* | 5/2012 | Kollmann | G06F 11/3476 714/45 |
| 8,464,103 B2* | 6/2013 | Adler | G06F 11/3636 714/45 |
| 8,745,150 B2* | 6/2014 | Kawada | G06F 17/30575 709/212 |
| 8,918,764 B2* | 12/2014 | Masser et al. | 717/128 |
| 2002/0138788 A1* | 9/2002 | Yenne | G06F 9/465 714/38.12 |
| 2004/0205723 A1 | 10/2004 | Juan et al. | |
| 2004/0250164 A1 | 12/2004 | Ahmad et al. | |
| 2005/0144521 A1 | 6/2005 | Werner | |
| 2005/0149601 A1 | 7/2005 | Cox et al. | |
| 2006/0230390 A1 | 10/2006 | Alexander, III et al. | |
| 2007/0006154 A1 | 1/2007 | Yang et al. | |
| 2011/0246640 A1 | 10/2011 | Saha et al. | |

\* cited by examiner

APPLICATION MONITORING

TECHNICAL FIELD

The present subject matter relates, in general, to software applications and, in particular, monitoring of software applications.

BACKGROUND

An application, also referred to as a software application, is executable software that performs specific tasks. At a certain instant, there may be multiple users executing a particular application. Further, usage of an application by number of users may hamper performance of the application. An application may be monitored to obtain details pertaining to performance of an application. For example, an application may be monitored to check scalability, responsiveness, quality of service (QoS) requirements of an application.

The application monitoring may assist an administrator to detect bottleneck points and respond to anomalies before the performance of the application degrades further. This results in the reduction of server downtime for maintenance of the application, which further leads to a better performance of the application.

Often times, during application monitoring, due to multiple users accessing the application concurrently, response time of the application may increase. It may be possible that transfer of huge volume of data directly from application to a database may lead to memory leaks. Further, monitoring process may hinder the performance of the application.

SUMMARY

This summary is provided to introduce concepts related to a method for application monitoring and the concepts are further described below in the detailed description. This summary is neither intended to identify essential features of the claimed subject matter nor is it intended for use in determining or limiting the scope of the claimed subject matter.

In an embodiment of the present subject matter, method(s) and systems) for performance monitoring of a software application is described. In one implementation, monitoring data pertaining to one or more components of a software application is obtained. The monitoring data is obtained based on user preferences. The monitoring data may be transferred to a monitoring buffer after a first predetermined rime interval. The monitoring data is further transferred from the monitoring buffer to a database after second predetermined time interval. The transfer of monitoring data from the monitoring buffer to the database is asynchronous of application execution process.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
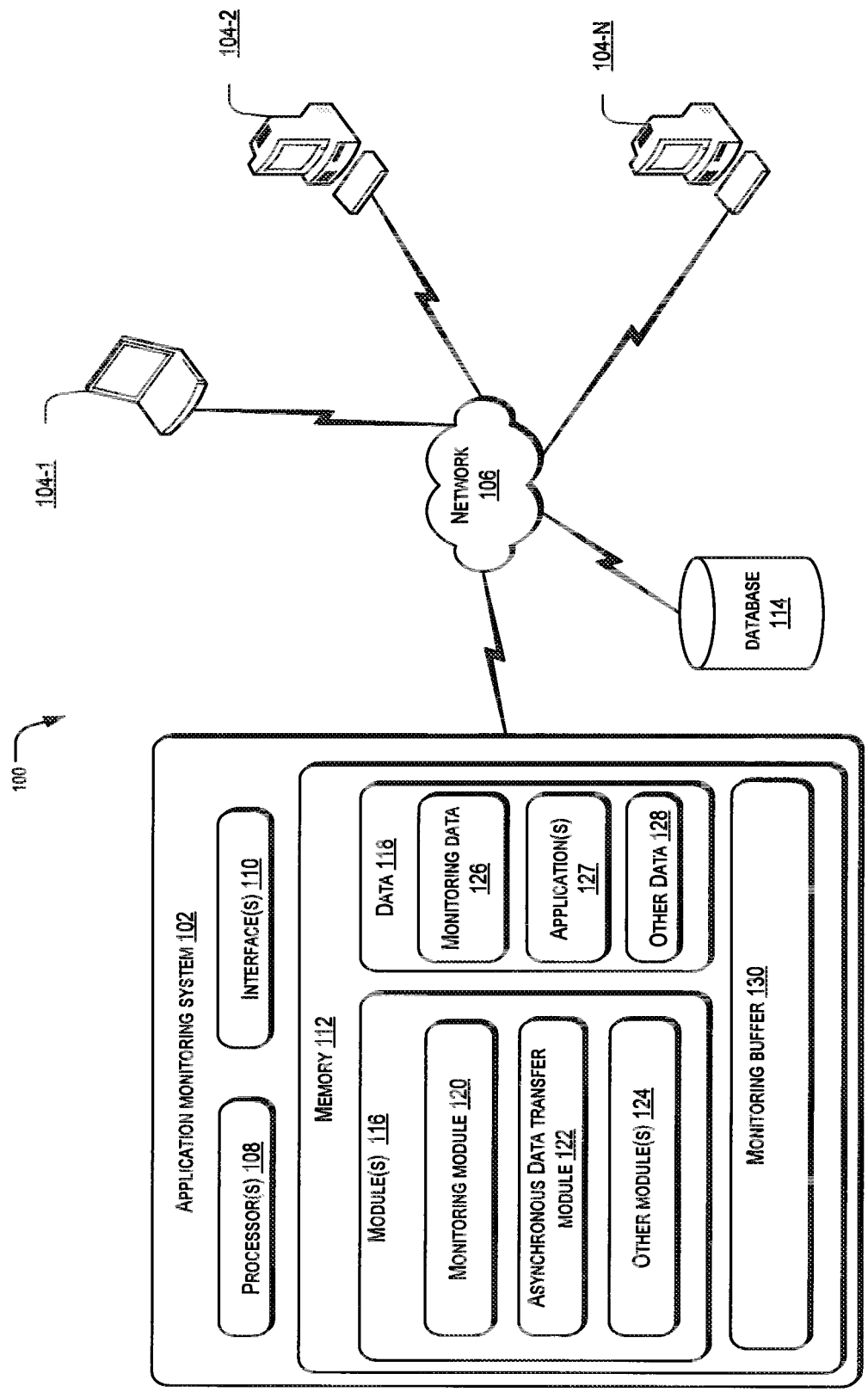
FIG. 1 illustrates a network environment implementing an application monitoring system, according to an implementation of the present subject matter.

The present subject matter relates to monitoring of software applications, also referred to as an application. In an embodiment, the present subject matter relates to performance monitoring of a Java™ application. An application may include several modules and each module may perform a predefined task. At a particular instant, there may be multiple modules that may be invoked by one or more users. For example, number of tines a module is invoked, i.e., invocation counts may be based on popularity or importance of a module. Simultaneous execution of the modules often leads to a complex operational structure of the application. In order to gather details pertaining to efficiency, performance, and other information application monitoring may be performed. For example, application monitoring may provide help in identifying bottleneck modules and anomalies associated with the execution of such modules. Further, timely identification or such bottlenecks may provide lesser maintenance downtime and improved availability of the application, since anomalies associated with the application can be addressed before they start impacting the performance of the application.

Typically, data collected while monitoring the application may be transferred to a permanent storage device, such as a database. The direct communication of monitoring function calls along with application execution function calls with the database may increase database network traffic. Generally, during execution of the application, time taken by monitoring process may get added up in the response time of the application. Thereby resulting in an undesirable increase in response time for the application execution process. Further in certain cases, updation to the database may unnecessarily increase the network traffic resulting in poor performance of the application. Further, in certain techniques, monitoring data may not be stored and may be provided directly to an administrator for the monitoring purposes. Thus in such cases, the monitoring data may not be available for the future references. Additionally, often times, monitoring process may be integrated with the application process, which may lead to poor performance of the application as the monitoring process may hamper the application execution process.

According to an embodiment of the present subject matter, system(s) and method(s) for monitoring of an application are described herein. Further, the applications may be executed as various application servers in a cluster environment. In an embodiment, an application may include multiple components, which may be defined at any granular level. For example, a component may be defined at a module level, where each module performs a separate business process. For instance, an application may include enrollment and project management as its two modules.

Each module may further comprise multiple sub-modules or business methods, where each such business method may perform a dedicated task within that module. Considering the above mentioned example, enrollment may further define its sub-module as household enrollment and loan enrollment. The loan enrollment may further include may define personal loan, education loan, car loan, etc., as further sub-modules.

The present subject matter provides data pertaining to performance and execution of the application occurring at the component level. In one implementation, data pertaining to performance and execution details of an application may be obtained. Such data may be hereinafter referred to as monitoring data. The monitoring data may include details pertaining to slow access of the application, response time, invocation counts, queries, etc. Further, the obtained monitoring data may correspond to target components of the application. The selection of the target components may be done based on predefined user preferences. Upon obtaining, the monitoring data may be transferred to a monitoring buffer for the temporary storage on a periodic basis. Further, the monitoring data may be further transferred to the database after a predetermined time interval. In an implementation, the predetermined time interval is configurable. Furthermore, the transfer process from the monitoring buffer to the database may be asynchronous with respect to application execution process. Asynchronous transfer ensures that the monitoring process does not hamper the application performance. Upon successful transfer of data from monitoring buffer to the database, the monitoring buffer may be flushed to receive monitoring data for corresponding to next monitoring cycle.

In addition, the monitoring data collected in the database stays in the database and may be fetched by users as when required. Further, monitoring the data may help a user in identifying bottleneck points of the application and anomalies in the functioning of the application. Further, the monitoring of the application is performed in a manner that it does interfere with the execution of the application, which not only results in better performance of the application but also ensures that substantially accurate data pertaining to the performance of the application is received.

In an embodiment of the present subject matter, the monitoring process may be configurable at runtime. Further, the initiation and termination of the monitoring process may be possible during the application execution without restarting an application server hosting the software application. In one implementation, the initiation and termination may be controlled through a property flag (True/False) defined in monitoring properties file configured in the application server. In an example, the 'True' value of the property flag may signify that the monitoring process is enabled and 'False' value may signify that the monitoring process is disabled. Therefore, depending on the value (True/False) defined for the property flag, the monitoring process may be started, continued or discontinued. Further, the application may be monitored at an application level, database level, or both. While monitoring at the application level, performance parameters, such as invocation count and response time for a user request may be gathered. While monitoring at the database level, a database query fired in response to a transaction corresponding to the user request may be gathered.

The above methods and systems are further described in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

While aspects of described systems and methods for application monitoring can be implemented in any number of different systems, environments, and/or configurations, the embodiments are described in the context of the following system architecture(s).

FIG. 1 illustrates a network environment 100 implementing an application monitoring system 102, according to an embodiment of the present subject matter. The application monitoring system 102 may be provided as an application server in cluster environment. Although, a single application server has been illustrated in FIG. 1, it will be understood that multiple application servers may also be provided. The application monitoring system 102 may be connected to one or more user devices 104-1, 104-2, . . . , 104-N via a network 106. For the purpose of explanation and clarity, the user devices 104-1, 104-2 . . . 104-N, are hereinafter collectively referred to as user devices 104 and individually referred to as user device 104.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and the like. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include network devices, such as network switches, hubs, and routers for providing a link between the application monitoring system 102 and the user devices 104. The network devices within the network 106 may interact with the application monitoring system 1(12 and the user device 104 through the communication links.

The application monitoring system 102 and the user devices 104 can be implemented as any of a variety of conventional computing devices including, for example, servers, a desktop PC, a notebook or a portable computer, a workstation, a mainframe computer, and an Internet appliance.

As illustrated, the application monitoring system 102 includes one or more processor(s) 108, one or more interface(s) 110 and a memory, such as a memory 112, coupled to the processor(s) 108. The interfaces 110 may include a variety of software and hardware interfaces, for example, interfaces for peripheral device(s), such as a keyboard, a mouse, an external memory, and a printer. Further, the interfaces 110 may enable the application monitoring system 102 to communicate with different computing systems, such as the user devices 104. The interfaces 110 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 110 may include one or more ports for connecting the user devices 104 to each other or to another computing system or a database, such as a database 114.

The processor 108 can be a single processing unit or a number of units, all of which could include multiple computing units. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions and data stored in the memory 112.

The functions of the various elements shown in the figures, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage.

The memory 112 may include any computer-readable medium known in the art including, for example, volatile memory, such as static random access memory (SRAM) and dynamic random access memory (DRAM) and/or non-volatile memory, such as read only memory (ROM), erasable programmable ROM, flash memories, hard disks, optical disks, and magnetic tapes. The memory 112 includes module(s) 116 and data 118. The modules 116, amongst other things, include routines, programs, objects, components, data structures, etc., which perform particular tasks or implement particular abstract data types. The modules 116 further include a monitoring module 120, an asynchronous data transfer module 122, and other modules 124.

The data 118 serves, amongst other things, as a repository for storing data processed, received and generated by one or more of the modules 116. The data 118 includes monitoring data 126, application(s) 127 may also be referred to as software application(s) 127, and other data 128. For the purposes of illustration, the application 127 has been shown as being stored in data 118. It will however be understood that the application 127 may alternatively be a part of modules 116 or may be hosted on an external storage device or another computing device. The other data 128 includes data generated as a result of the execution of one or more modules 116.

Further, the memory 112 includes one or more applications 127. Further, the application 127 may include multiple components, which may be invoked by various users. The components may be defined at any level of granularity. In an example, the components may be categorized at a module level. A component may further comprise multiple business methods. Some of these components may be considered of a particular importance in application execution process. A user may wish to monitor such components having a particular importance comparable to other components. Such components may be referred to as target components.

In implementation, the monitoring module 120 of the application 127 may be configured to monitor and provide details pertaining to the performance of the application 127. The monitoring module 120 may identify the target components of the application 127, based on user preferences. In an example, users who wish to monitor the application 127 may define their preferences at run time. Further, the monitoring module 120 may define the execution points in the application 127. The execution points may be considered as a group of point cuts and their execution. The execution points may be the target components which need to be monitored. In an example, the monitoring module 120 may be defined using aspect oriented programming. Thus, the monitoring module 120 may determine performance parameters corresponding to each of the target components of the application 127 and store in the monitoring data 126. In an example, the performance parameters may be invocation counts, response time, database query, etc. A request for invoking one or more components of an application 127 may be referred to as business request. It will be understood that each business request may invoke multiple components and hence there may be multiple transactions. For each transaction corresponding to a business request, the performance parameters may be obtained.

An invocation count for a component may be understood as a number of times that component is invoked. A counter may keep the record of invocation counts corresponding to a component. The counter may be raised whenever there is a hit for the particular component. The invocation count may also define popularity of that particular component among users, i.e., the more the invocation count of a component, the higher is the popularity. Often times, such popular components become the bottleneck components of an application 127 and improving the performance of such components may improve the overall performance of the application 127.

Once a particular component is invoked by a user, the application 127 may take some time in generating a response or required output in response to such invocation. Time taken by the application 127 to generate the output corresponding to a user request is referred to as the response time for the user request. Based on the user request or input, a particular component is invoked. Further, the application monitoring system 102 may tire at least one query in response to the transaction to obtain the required output.

The monitoring module 120 may provide the monitoring data 126 associated with the target components to a temporary storage device, such as a monitoring buffer 130. It will be understood that the monitoring data 126 will correspond to a previous monitoring cycle, where each cycle is of the first predetermined time interval. In an example, structure of data that is to be stored in the monitoring buffer 130 may be predefined by a user. Further, in an example, the monitoring buffer may be fast memory, such as cache. Thus, the monitoring data 126 may be efficiently provided to the monitoring buffer 130, thereby saving on computational time and resources.

The monitoring buffer 130 may store the monitoring data 126 for a second predetermined time interval. From the monitoring buffer 130, the asynchronous data transfer module 122 may transfer the monitoring data 126 to the database 114 after every second predetermined time interval. The monitoring data 126 from the monitoring buffer 130 is transferred to the database 114 such that the execution of the application 127 is independent of the monitoring process. Thus, the monitoring process does not hinder with the execution of the application 127. The independent working may be ensured since the network for transferring monitoring data 126 from the monitoring buffer 130 to the database 114 is separate from the one in which the application 127 is executing.

Further, the asynchronous data transfer module 122 may flush the stored monitoring data 126 from the monitoring buffer 130 once a database updation criteria is met. The database updation criteria may be at least one of successful completion of previous transfer cycle from the monitoring buffer 130 to the database 114 and the expiration of a third predetermined time interval. This results in efficient usage of buffer memory and lossless data transfer. Flushing of the monitoring data 126 from the monitoring buffer 130 following the successful data transfer to the database 114 minimizes the possibilities of data loss during transfer and avoids memory leaks. Further, it will be understood that the monitoring module 120 may be in sync with the asynchronous data transfer module 122 so that the monitoring buffer 130 is accordingly updated and flushed.

In an embodiment, the first, second, and third predetermined time intervals may be predefined by a user and may be reset based on the requirements and data volumes. The first, second, and third predetermined time intervals may be same or different depending on the user preference. The duration of the predetermined time intervals may be changed at runtime allowing the user to control memory usage by the monitoring buffer 130. The tune intervals may be defined optimally to provide efficient monitoring process.

In an embodiment, the asynchronous data transfer module 122 may further be configured to periodically check the value defined for a property flag (True/False) in monitoring properties files, and control the initiation and termination of the monitoring process based on the status. For example, if the value of the property flag changes from 'False' to 'True', the asynchronous data transfer module 122 may flush the monitoring data 126 corresponding to the previous data transfer cycle from the monitoring buffer 130, upload the property file to initiate the monitoring process, and the monitoring process may then proceed as mentioned above. Alternatively, when the value of the property flag changes from 'True' to 'False', the asynchronous data transfer module 122 may similarly terminate the ongoing monitoring process. Thus the monitoring process may be initiated and terminated without restarting a server hosting the application 127.

The database 114 stores the monitoring data 126 received from the asynchronous data transfer module 122. The database 114 may be a permanent storage device and may be archived, if required. Thus, the database 114 makes available data pertaining to performance of the application 127 for future references. Thus, instead of transferring monitoring data 126 directly to the database 114, it is first transferred to the monitoring buffer 130. Since, the monitoring buffer 130 is a fast memory, therefore time taken to transfer data is substantially reduced thereby not hindering the performance of the application 127. This may provide for faster response time, thereby enhancing the performance of the application 127 and also not hindering with the execution of the application 127. Further, such a provision provides for reduction in network traffic as the database 114 is not overloaded with large number of updates simultaneously.

The user device 104 may fetch the monitoring data 126 from the database 114 as per the requirement using a graphical monitoring tool, such as JConsole™. Further, the graphical monitoring tool may also facilitate fetching of data in a required format. The user may send a query via corresponding user device 104 to obtain monitoring data over a given interval for a particular application 127. The graphical monitoring tool may obtain required data from the database 114 and display it on the user device. For example, the monitoring data 126 may be provided as Mbean™ objects.

in an embodiment, the application monitoring system 102 may be configured to analyze the monitoring data based on predefined analysis rules and provide a response based on the analysis. For example, the predefined analysis rules may define a threshold response time. In said example, if it is determined the response time for a user request is greater than a threshold response time; an alert may be provided to a concerned user. In another example, predefined analysis rules may describe rules to identify red flag components, say, based on invocation counts or response time. In said example, the application monitoring system 102 may highlight the red flag components or the most popular component.

In another embodiment, upon fetching data from the database 114, a user may analyze the fetched monitoring data and take corrective measures for improving the performance of various components of the application 127. This further provides for enhancement of the performance of the application 127 by incorporating the appropriate changes in the application 127. For example, popular components may be tweaked to improve the performance of the application 127. Additionally, identification of popular components may help in taking business related decisions as well, for example, area of further growth.

The present subject matter further provides application monitoring for the client server applications as well as for the desktop applications. In desktop applications, the monitoring data 126 may be viewed by integrating a server, implementing described monitoring process, with the desktop application.

Figure 2:
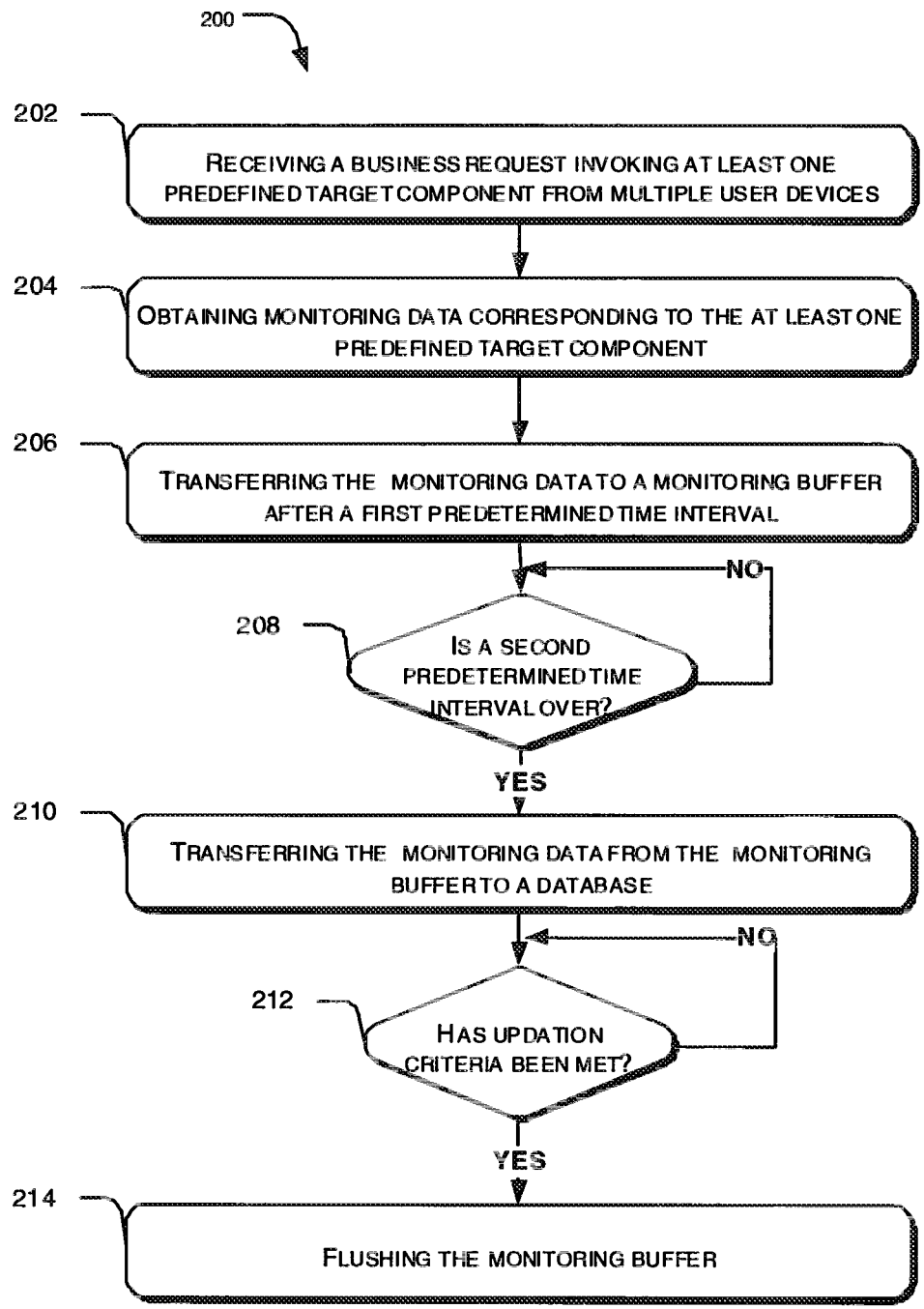
FIG. 2 illustrates a method for monitoring an application, according to an implementation of the present subject matter.

FIG. 2 illustrates a method 200 for application monitoring, according to an implementation of the present subject matter. The method 200 may be implemented in a variety of computing systems in several different ways. For example, the method 200, described herein, may be implemented using the application monitoring system 102.

The method 200, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method 200.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. It will be understood that even though the method 300 is described with reference to the application monitoring system 102, the description may be extended to other systems as well.

Referring to FIG. 2, at the block 202, one or more requests invoking the target components corresponding to an application, such as the application 127, is received from one or more user devices, such as the user devices 104. The requests may invoke one or more target components of the application 127. A target component may be a component that needs to be monitored and such target components may be selected by a user at run-time or prior to execution of the application 127. Following the invocation of at least one of the target components, the method 200 branches to block 204.

At block 204, monitoring data corresponding to invoked target components is obtained. The monitoring data 126 may include performance parameters associated with each of the target components. The performance parameters may be response time corresponding to a user request associated with a target component, invocation count of a target component, queries fired in response to a transaction, etc.

At block 206, obtained monitoring data 126 is transferred to a monitoring buffer, such as monitoring buffer 130 after a first predetermined time interval. Thus, the monitoring data 126 is transferred to the monitoring buffer 130 periodically. In an implementation, the monitoring module 120 transfers the monitoring data 126 to the monitoring buffer 130.

At block 208, it is determined if a second predetermined time interval is over. In an implementation, the asynchronous data transfer module 122 determines whether the second predetermined time interval is over. If it is determined that the second predetermined time interval is over, ("Yes" branch from block 208), the method 200 branches to block 210. At block 210, the monitoring data 126 from the monitoring buffer 130 is transferred from the monitoring buffer 130 to a database, such as the database 114. Thus, the database 114 is updated with the latest monitoring data periodically. However, if it is determined that the second predetermined time interval is not over, ("No" branch from block 208), the method 200 branches back to block 208.

At block 212, it is determined whether a database updation criteria is met. If it is determined that the database updation criteria are met, ("Yes branch from block 212), the method 200 moves to block 214. In an implementation, the asynchronous data transfer module 122 determines if the data updation criteria is met.

At block 214, the monitoring data 126 may be flushed from the monitoring buffer 130, when the database updation criteria. In an example, the asynchronous data transfer module 122 may flush the monitoring buffer 130 after successful transfer of monitoring data 126, to ensure lossless data transmission. In another example, the asynchronous data transfer module 122 may flush the monitoring buffer 130 upon lapse of a third predetermined time interval and successful data transfer.

Referring back to block 212, if it is determined that the database updation criteria is not met ("No" branch from block 212), the method 200 branches back to block 212 and the transfer of monitoring data 126 from the monitoring buffer 130 is continued.

Although embodiments for methods and systems for application monitoring have been described in a language specific to structural features and/or methods, it is to he understood that the invention is not necessarily limited to the specific features or methods described. Rather, the specific features and methods are disclosed as exemplary embodiments for application performance monitoring.

We claim:

1. A computer implemented method for monitoring a software application the method comprising:
    obtaining monitoring data pertaining to one or more target components of the software application, based on preferences of a user, wherein the monitoring data comprises data pertaining to the software application at least one of an application level and a database level and wherein the monitoring data comprises at least one of a response time, a query, and an invocation count corresponding to each of the one or more target components;
    providing the monitoring data corresponding to a previous monitoring cycle periodically to a monitoring buffer over a first network, wherein the first network is for executing the software application, and wherein the previous monitoring cycle is a first predetermined time interval determined by a user;
    transferring the monitoring data from the monitoring buffer to a database after a second predetermined time interval over a second network, wherein the second network is for transferring the monitoring data and is different from the first network, wherein transfer of the monitoring data from the monitoring buffer to the database is asynchronous with execution of the software application, wherein the first predetermined time interval and the second predetermined time interval are configurable by the user at a runtime to control memory usage of the monitoring buffer; and
    flushing the monitoring data from the monitoring buffer based on a data updation criteria.

2. The computer implemented method as claimed in claim 1, wherein flushing the monitoring data based on the data updation criteria comprises:
    ascertaining whether the data updation criteria is met; and
    flushing the monitoring data from the monitoring buffer when the data updation criteria is met.

3. The computer implemented method as claimed in claim 2, wherein the method further comprises continuing transferring the monitoring data from the monitoring buffer to the database, when the data updation criteria is not met.

4. The computer implemented method as claimed in claim 2, wherein the data updation criteria includes at least one of;
    successful completion of a previous transfer cycle from the monitoring buffer to the database; and
    expiration of a third predetermined time interval.

5. An application monitoring system comprising:
    a processor(s); and
    a memory coupled to the processor, the memory comprising;
        a monitoring module configured to provide monitoring data corresponding to one or more target components of a software application corresponding to a previous monitoring cycle periodically to a monitoring buffer over a first network, wherein the first network is for executing the software application, wherein the previous monitoring cycle is a first predetermined time interval determined by a user, and wherein the monitoring data comprises at least one of a response time, a query, and an invocation count corresponding to each of the one or more target components; and
        an asynchronous data transfer module configured to transfer the monitoring data from the monitoring buffer to a database after a second predetermined time interval over a second network, wherein the second network is for transferring the monitoring data and is different from the first network, wherein transfer of the monitoring data from the monitoring buffer to the database is asynchronous with execution of the software application, wherein the first predetermined time interval and the second predetermined time interval are configurable by the user at a runtime to control memory usage of the monitoring buffer;
        wherein the asynchronous data transfer module is further configured to flush the monitoring data from the monitoring buffer based on a data updation criteria.

6. The application monitoring system as claimed in claim 5, wherein the monitoring module is further configured to identify the one or more target components based on preferences of a user.

7. The application monitoring system as claimed in claim 5, wherein the asynchronous data transfer module is further configured to:
    ascertain whether the data updation criteria is met; and
    flush the monitoring data from the monitoring buffer when the data updation criteria is met, wherein the data updation criteria is at least one of successful completion of a previous transfer cycle from the monitoring buffer to the database and expiration of a third predetermined time interval.

8. The application monitoring system as claimed in claim 5, wherein the asynchronous data transfer module is further configured to:
    periodically check a status of a property flag corresponding to the software application; and control an initiation and a termination of a monitoring process for the software application based on the status of the property flag.

9. The application monitoring system as claimed in claim 5, wherein application monitoring system is configured to analyze the monitoring data based on predefined analysis rules and provide a response based on the analysis.

10. The application monitoring system as claimed in claim 5, wherein the monitoring buffer is a temporary storage device.

11. A computer-readable medium having embodied thereon a computer program for executing a method comprising:
- obtaining monitoring data pertaining to one or more target components of the software application, based on preferences of a user wherein the monitoring data comprises data pertaining to the software application at least one of an application level and a database level and wherein the monitoring data comprises at least one of a response time, a query, and an invocation count corresponding to each of the one or more target components;
- providing the monitoring data corresponding to a previous monitoring cycle periodically to a monitoring buffer over a first network, wherein the first network is for executing the software application, and wherein the previous monitoring cycle is a first predetermined time interval; and
- transferring the monitoring data from the monitoring buffer to a database after a second predetermined time interval over a second network, wherein the second network is for transferring the monitoring data and is different from the first network, wherein transfer of the monitoring data from the monitoring buffer to the database is asynchronous with execution of the software application, wherein the first predetermined time interval and the second predetermined time interval are configurable by the user at a runtime to control memory usage of the monitoring buffer; and
- flushing the monitoring data from the monitoring buffer based on a data updation criteria.

12. The computer readable medium as claimed in claim 11, wherein the method further comprises:
- ascertaining whether the data updation criteria is met; and
- flushing the monitoring data from the monitoring buffer when the data updation criteria is met.

13. The computer readable medium as claimed in claim 12, wherein the method further comprises continuing transferring the monitoring data from the monitoring buffer to the database, when the data updation criteria is not met.

14. The computer readable medium as claimed in claim 12, wherein the data updation criteria includes at least one of:
- successful completion of a previous transfer cycle from the monitoring buffer to the database; and
- expiration of a third predetermined time interval.

* * * * *